United States Patent Office 3,486,478
Patented Dec. 30, 1969

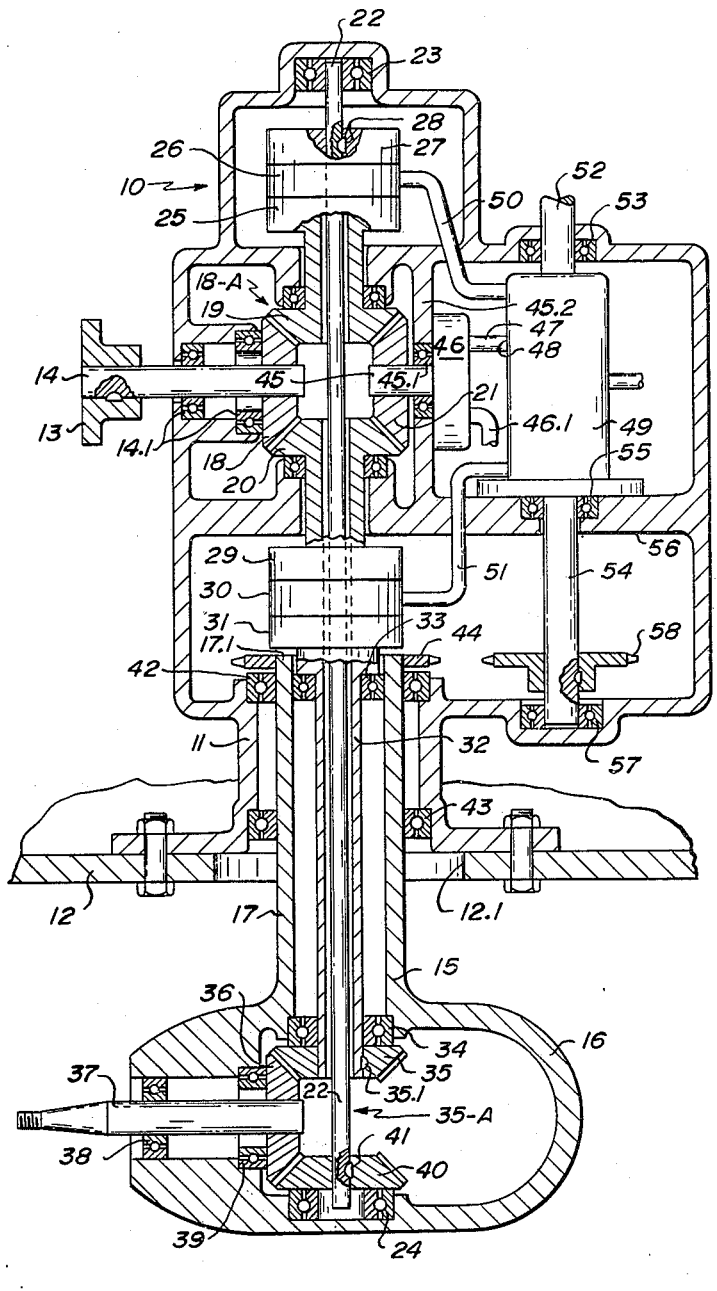

3,486,478
STEERABLE MARINE DRIVE
Gerald H. Halliday, P.O. Box 321, Nanaimo,
British Columbia, Canada
Filed Nov. 13, 1967, Ser. No. 685,998
Claims priority, application Great Britain, Nov. 15, 1966,
51,042/66
Int. Cl. B63h 25/42, 5/12
U.S. Cl. 115—35                                   3 Claims

ABSTRACT OF THE DISCLOSURE

A steerable marine drive, a propeller shaft of a 360° rotatable nacelle driven through bevel gearing by two oppositely rotating drive shafts, so that torque is balanced with no tendency of the nacelle to rotate. A servo controlled clutch of each drive shaft so that, with but one clutch engaged, unbalanced torque causes the nacelle to turn, thus providing steering.

BACKGROUND OF THE INVENTION

The invention relates to a steerable marine drive of a balanced torque type.

Balanced torque drives are known, for instance as shown in a U.S. Patent 2,335,577/63 issued to Mathenson and in U.S. Patents 2,499,339/50, 2,532,470/50 and 2,755,765/56 to Wanzer.

In certain drives of this type a short horizontal propeller shaft has a bevelled gear at an end thereof remote from the propeller, which bevel gear is driven by two axially aligned bevel gears of equal pitch diameter rotating in opposite directions. One of the said driving bevel gears is secured to a hollow shaft and the other is secured to an inner shaft coaxial with the hollow shaft and rotatable therein, prime mover means being provided to rotate the inner shaft in one direction and the hollow shaft in an opposite direction. It is clear that the shaft torques, being equal and opposite, will cancel out. The propeller shaft, the hollow and solid shafts, and the gears are enclosed in a suitable housing or nacelle.

OUTLINE OF THE INVENTION

The present invention utilizes a balanced torque drive generally as above described including, an outer hollow shaft and an inner coaxial shaft, and means to rotate the shafts at equal speeds in opposite directions. However in the present invention, the nacelle is a part of a lower housing having a hollow vertical column extending through and journalled in the bottom of the vessel, so as to be rotatable about a vertical axis. The hollow shaft and the inner shaft are mounted coaxially within the said column. Drive means are provided capable of rotating the inner shaft in one direction and the outer shaft in an opposite direction simultaneously. Additionally, structure is provided by means of which either shaft may be driven alone.

In this way, when both shafts are rotating so driving the propeller shaft, torque is balanced as before so that there is no tendency for the lower housing to revolve. However, when the drive is by either shaft alone the lower housing, and with it the propeller shaft, will rotate because of unbalanced torque, the direction of rotation depending upon which shaft is driving the popeller. This effect is utilized to provide steering.

I attain the above results by providing two clutches each having drive elements, the said driver elements being rotated by prime mover means—the ship's engine—in opposite directions. A driven element of one clutch is secured to the hollow outer shaft, and a driven element of the second clutch to the inner shaft. Hence, when both clutches are engaged, both shafts will transmit torque to drive the propeller, when but one clutch is engaged but one shaft will drive, thus to produce an unbalanced torque which, as above explained, will cause the vertical column to rotate so steering the vessel.

Thus a central concept of my invention is deliberate introduction of unbalanced torque to effect steering.

STRUCTURE AND OPERATION

I employ fluid clutches together with a fluid pump suitably driven by the prime mover. The fluid pump provides a fluid under pressure, controllable by valve means so that at will, both clutches may be engaged simultaneously, or either may be disengaged the other remaining engaged—that is to say, the valve provides means for selective engagement and disengagement of the clutches. As well both clutches may be disengaged at the same time so that, for instance, a winch may be driven independently of the propeller. Fluid from the pump is controlled by rotary servo valve means having follow means which rotate with rotation of the lower housing vertical column, the follow means being constructed and arranged so that when a control shatf of the valve is rotated to cause one or another of the valves to disengage, the follow shaft, rotating with the vertical column, follows the motion of the control shaft so as to cause the said clutch to re-engage when the motion of the follow shaft has overtaken that of the control shaft.

The main housing is rotatable without limit, that is to say it can be constructed to be capable of rotating a full 360 degrees. Thus a device according to my invention not only is capable of steering a ship but also can obviate necessity for a reversing gear.

One or several such drives may be used. In a barge vessel, for example, two bow and two stern propellers may be used. In such case the barge may be made to turn about a central vertical axis if required.

It is to be understood that the fluid clutches, controllable by the valve means, may be engaged, partially engaged, or disengaged. Hence as one clutch is partially engaged whilst the other remains engaged, the unbalanced torque and hence the speed of rotation of the vertical column is nicely controllable.

DESCRIPTION OF THE DRAWINGS

The figure is an assembly drawing showing a section through a vertical centre line of drive apparatus according to the invention, some parts not being shown in section. The drawing is diagrammatic.

DETAIL DESCRIPTION

There follows a detail description of a specific embodiment, related to the drawing. The description is given by way of example, the invention not being confined to specific structure of the example.

The numeral 10 generally designates drive apparatus according to the invention. A main housing 11 is secured to a bottom 12 of a hull of a ship, centrally of an opening 12.1 of the bottom aforesaid. The apparatus has a coupling 13, secured to an outer end of a drive shaft 14, which coupling is attached to a drive shaft of a prime mover, not shown. A lower housing 15 has a nacelle portion 16 and, extending upwards generally centrally thereof, a hollow vertical column 17 extending through the hull opening 12 aforesaid. The drive shaft 14 is generally horizontally disposed, and extends inward through the housing 11 being obviously journalled therein as seen at 14.1. A prime mover bevel drive assembly, designated generally 18–A, has a bevel gear 18 is secured to an inner end of the shaft 14, which gear engages bevel gears 19, 20, and 21, axes of all of the said gears being coplanar, with the axes of the gears 18, 21, and those of the gears 19, 20, mutually at right angles. The gears 18 and 21 have equal pitch diameters, as do the gears 19 and 20. The pitch diameters of gears 19 and 20 can be equal to the pitch diameter of gears 18 and 21 when all gears will have the same speed. The bevel gears 18, 19, 20, 21 are referred to respectively as; drive bevel, upper bevel, lower bevel, and pump bevel, hereinafter.

A central vertical shaft 22 extends through the main housing 11 from an upper journal 23 in an upper central extremity of the main housing 11, downwards to a lower journal 24 at a bottom of the nacelle 16. It is to be noted that the upper and lower bevel gears 19 and 20 are free of the vertical shaft 22 so that it is not directly driven by these gears. The upper bevel 19 is shown as being integral with a drive element 25 of an upper hydraulic clutch 26 having a driven element 27 secured, as seen at 28, to the vertical shaft 22. The upper bevel 19 and the clutch drive element 25 are shown as integral for convenience of illustration. It is thus seen that when the upper hydraulic clutch 26 is engaged (by means which later will be described) the vertical shaft 22 will revolve when the drive shaft 14 is rotated by the prime mover.

The lower bevel 20 is similarly shown as being integral with a drive element 29 of a lower hydraulic clutch 30 having a driven element 31. For convenience of illustration, the driven element 31 is also shown as being integral with a hollow shaft 32. The hollow shaft 32 is coaxial with the central vertical shaft 22, being free to revolve with respect thereto. The hollow shaft is journalled in an upper bearing 33 of the lower housing vertical column 17, and in a lower bearing 34 at a lower end of the said vertical column 17, as shown. A lower drive bevel 35 of a propeller drive assembly 35–A is keyed to a lower end of the hollow shaft 32 extending through the bearing 34 aforesaid, as indicated at 35.1.

It is seen that when the lower hydraulic clutch 30 is engaged (by means which later will also be described) rotation of the drive bevel 18 of the prime mover drive assembly 18–A in engagement with the lower bevel 20 will cause the hollow shaft 32 to rotate, so driving the lower drive bevel 35 of the propeller drive bevel assembly 35–A. It is also apparent that the direction of rotation of the hollow shaft 32 will be opposite to that of the central vertical shaft 22. The lower drive bevel 35 engages a propeller shaft bevel 36 secured to an inner end of a propeller shaft 37 extending through the nacelle 16 aforesaid, and journalled therein as shown at 38 and 39. The propeller shaft bevel 36 also engages a central shaft lower bevel 40 keyed to the lower end of the vertical shaft 22 as seen at 41. The bevels 35, 36, and 40, of the propeller drive assembly are coaxial and mutually at right angles, pitch diameters of the bevels 35 and 40 being equal.

The lower housing vertical column 17 extending through the hull opening 12.1 is journalled in upper and lower bearings 42 and 43, a part of the said column extending upwards beyond the upper bearing 42 as shown at 17.1. The lower housing 15 is thus free to rotate within the bearings 42 and 43 aforesaid about a vertical axis. A sprocket 44, the purpose of which will be described later in this disclosure, is secured to the outwardly extending part 17.1 of the column 17, obvious means being provided to restrain the lower housing against axial movement.

The propeller shaft and drive shaft have been described as being horizontal and other shafts as vertical. Should it be required that the propeller shaft be inclined to the horizontal the whole apparatus may be suitably disposed to effect a required inclination. Alternately, a bevel assembly can be provided wherein the shafts are not at right angles.

OPERATION GENERALLY

It is now clear that, if the upper clutch 26 and the lower clutch 30 are simultaneously engaged, the propeller shaft 37 is driven both by the lower drive bevel 35 of the hollow shaft 32 and by the vertical shaft bevel 40, of the central vertical shaft 22, the shafts revolving in opposite directions. The torque upon these two shafts being equal and opposite, by the resultant torque which, otherwise, would tend to rotate the nacelle 16, is zero.

If the upper clutch 26 is disengaged, the lower clutch 30 remaining in engagement, only the outer hollow shaft 32 will be directly driven by the prime mover. While the inner vertical shaft 22 will be rotated by the vertical shaft lower bevel 40, the shaft 22 will simply turn because the upper clutch 26 is disengaged—there will be no torque therein. Consequently, there being nothing to resist the torque of the hollow shaft 32, the nacelle 16 will tend to revolve in the bearings 42 and 43 so long as these conditions persist. When the upper clutch 26 is engaged, the lower clutch 30 being disengaged, torque will appear only in the shaft 22—revolving in an opposite direction— hence the nacelle will tend to revolve as before explained, but now in an opposite direction.

It is to be noted that, in both of the instances above, the unbalanced torque is the torque developed by the prime mover in rotating the drive shaft 14.

HYDRAULIC AND STEERING STRUCTURE

The pump bevel 21 of the prime mover assembly 18-A is secured to an inner end of a short shaft 45 suitably journalled as shown at 45.1 in an inner partition 45.2 of the main housing 11. To an outer end of the shaft 45 is secured a hydraulic pump 46 driven by the said shaft, the pump having an inlet line 46.1 from a supply source (not shown) and a discharge line 47 leading to an intake port 48 of a rotary servo valve 49. The rotary servo valve has an upper discharge line 50 leading to the upper hydraulic clutch 26 to engage and disengage it, and a lower discharge line 51 leading to the lower hydraulic clutch 30 to engage and disengage it. Thus means selectively to engage and disengage the clutches are provided.

The hydraulic pump 46, the upper and lower hydraulic clutches 26 and 30, and the rotary servo valve 49, can all be stock fixtures obtainable from ordinary trade sources.

The rotary servo valve 49 has a central upwardly extending shaft 52, suitably journalled in an outer wall of the main housing 11 as indicated at 53—the shaft 52 will now be referred to as the steering shaft. The rotary servo valve also has a downwardly extending follow shaft 54 aligned with the steering shaft and suitably journalled as seen at 55 in a horizontal interior wall of 56 of the main housing, a lower end of the said shaft being journalled as indicated at 57 in a lower wall of the main housing.

A sprocket 58 is secured to the follow shaft and a chain, not shown, engages the sprocket 58 and the sprocket 44— which latter, as before stated, is secured to the vertical column 17 of the lower housing 15 to rotate therewith. Both sprockets being of the same pitch diameter, the follow shaft rotates with rotation of the lower housing 15.

The rotary servo valve 49 is constructed and arranged to operate as follows. A steering wheel or tiller (not shown) being secured to the steering shaft 52, in a central or straight ahead position of the steering wheel both clutches are engaged, hence the central shaft 22 and the hollow shaft 32 both rotate.

Commencing from a position of the lower housing 15 whereat the vessel is travelling straight ahead, upon rotating the steering shaft in one direction from the above position, one hydraulic clutch, for instance the upper clutch 26, will disengage causing the lower housing to tend to rotate strongly in one direction because of the unbalanced torque aforesaid then developed.

This is effected by the rotary servo valve directing fluid under pressure to the upper line 50.

As the lower housing rotates, the follow shaft is also rotated by the chain and sprocked means 44, 58 to follow the position of the steering shaft. When that position has been attained, that is when the follow shaft rotation overtakes the steering shaft rotation, the upper clutch 26 now re-engages and the lower housing will be disposed at an angle to a longitudinal axis of the hull according to the amount by which the steering shaft has been turned, re-engagement being effected by the servo valve cutting off pressure in the line 50.

To put the ship in a straight ahead position the steering shaft 52 is turned back to the neutral position, which rotation will cause the rotary servo valve to admit fluid to disengage the lower hydraulic valve 30, when sequence of events as above described will occur in reverse order until the propeller shaft is again aligned with the longitudinal axis of the ship.

EQUIVALENT CLUTCH AND CONTROL STRUCTURE

The terms "fluid clutches" and "hydraulic clutches" have been used herein with reference to the clutches 26 and 30. It is to be understood that drives having equivalent action, for instance torque converter drives which can be constructed and arranged for a clutch-like action are intended to be included. As well, mechanical clutches could be substituted and magnetic clutches can also be used to serve as equivalents. It is necessary only to provide a clutch action, that is to say means of engagement and disengagement—preferably of gradual engagement and disengagement—and means to effect engagement and disengagement as described.

Mechanism of the rotary servo valve 49 has not been described in detail as valves functioning as described are well known, and are obtainable from ordinary trade sources. When for example electrically actuated clutches are used, electrical means to actuate the clutches in the manner aforesaid are known.

While the particular kind of clutch used, and the particular means used to effect the required operation of the clutches, are unimportant for the purposes of the present invention, hydraulic means substantially as described are preferred as being simple and reliable.

I claim:
1. In a steerable marine drive, the combination of a stationary housing adapted to be secured to the bottom of a ship's hull, a hollow vertical column rotatably journalled in said housing and projecting downwardly therefrom, a nacelle provided at the lower end of and rotatable with said column, a central vertical shaft and surrounding hollow shaft disposed axially in said column and rotatable independently of the column and of each other, a horizontal propeller shaft journalled in said nacelle, a gear drive provided in the nacelle and operatively connecting said central shaft and said hollow shaft to said propeller shaft for driving the latter with normally balanced torque, a horizontal drive shaft journalled in said housing and adapted to be driven by a prime mover, a drive bevel secured to said drive shaft, upper and lower bevels rotatably positioned on the respective central shaft and hollow shaft for rotation independently thereof and meshing with said drive bevel, upper and lower fluid-actuated clutches normally drivingly connecting the respective upper and lower bevels to the central shaft and hollow shaft to provide a normally balanced torque drive of said propeller shaft when said clutches are engaged and an unbalanced torque drive which causes rotation of said column in said housing when either of said clutches is disengaged, a fluid pump provided in said housing and having a fluid outlet, a bevel drive for said pump meshing with said upper and lower bevels, a rotary servo valve provided in the housing and having a fluid inlet in communication with the fluid outlet of said pump, said servo valve also having upper and lower fluid delivery lines connected to the respective upper and lower clutches for normally maintaining the same engaged in the normally balanced torque condition of the drive, a rotatable steering shaft connected to said servo valve for disengaging either of said clutches to produce an unbalanced torque drive and rotation of said column in said housing, a a follow shaft rotatably journalled in the housing and connected to said servo valve in axial alignment with said steering shaft, and means operatively connecting said follow shaft to said column for rotation therewith so that when either of said clutches is disengaged by the servo valve in response to rotation of the steering shaft, the disengaged clutch may be engaged by the servo valve in response to rotation of the follow shaft when the latter overtakes rotation of the steering shaft.

2. The device as defined in claim 1 which is further characterized in that the axis of rotation of said bevel drive for said pump is coaxial with said drive shaft.

3. The device as defined in claim 1 which is further characterized in that said means operatively connecting said follow shaft to said column comprises a chain and sprocket drive.

References Cited

FOREIGN PATENTS 822,204 10/1959 Great Britain.
975,436 11/1964 Great Britain.

OTHER REFERENCES

German printed application No. 1,165,442, Mar. 12, 1964 (Engelbrecht).

TRYGVE M. BLIX, Primary Examiner